(12) United States Patent
Kushida et al.

(10) Patent No.: US 8,871,337 B2
(45) Date of Patent: Oct. 28, 2014

(54) INTERMEDIATE TRANSFER MEMBER FOR TRANSFER INK JET RECORDING

(75) Inventors: Midori Kushida, Tokyo (JP); Mitsutoshi Noguchi, Kawaguchi (JP); Yoshikazu Saito, Inagi (JP); Mamiko Kaji, Kawasaki (JP); Hikaru Ueda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/813,064

(22) PCT Filed: Jul. 23, 2011

(86) PCT No.: PCT/JP2011/004160
§ 371 (c)(1),
(2), (4) Date: Jan. 29, 2013

(87) PCT Pub. No.: WO2012/014427
PCT Pub. Date: Feb. 2, 2012

(65) Prior Publication Data
US 2013/0127965 A1    May 23, 2013

(30) Foreign Application Priority Data
Jul. 30, 2010    (JP) ................. 2010-172932

(51) Int. Cl.
*B32B 27/32*    (2006.01)
*B41J 2/005*    (2006.01)
(Continued)

(52) U.S. Cl.
CPC ............ *B41J 2/0057* (2013.01); *C08J 2321/00* (2013.01); *B32B 27/32* (2013.01); *C08J 5/125* (2013.01); *C08J 5/18* (2013.01); *B41M 5/52* (2013.01); *B41M 5/44* (2013.01); *B41M 5/42* (2013.01); *C08J 5/124* (2013.01); *B32B 27/08* (2013.01); *B41M 5/0256* (2013.01); *B41M 5/03* (2013.01); *B41M 5/502* (2013.01); *Y10S 428/914* (2013.01)

USPC .................. 428/220; 428/466; 428/914

(58) Field of Classification Search
CPC ............ B32B 27/08; B32B 27/32; C08J 5/18; C08J 2321/00; C08J 5/124; C08J 5/125; B41M 5/44; B41M 5/42; B41M 5/52
USPC ........................... 428/220, 466, 914
See application file for complete search history.

(56) References Cited

U.S. PATENT DOCUMENTS 5,582,941 A    12/1996  Kato et al.
2003/0087061 A1    5/2003  Tashiro
(Continued)

FOREIGN PATENT DOCUMENTS

EP    1226971 A2    7/2002
EP    1384596 A1    1/2004
(Continued)

*Primary Examiner* — Betelhem Shewareged
(74) *Attorney, Agent, or Firm* — Canon U.S.A., Inc. IP Division

(57) ABSTRACT

There is provided an intermediate transfer member for transfer ink jet recording in which formation of cracks on its surface is suppressed and that has good transferability. The intermediate transfer member for transfer ink jet recording includes a surface layer, a buffer layer, and a compression layer, wherein the surface layer, the buffer layer, and the compression layer are formed in that order from the image-forming surface side, a compression modulus (E1) of the surface layer is 300 MPa or more and 10000 MPa or less, a compression modulus (E2) of the buffer layer is 0.5 MPa or more and 30.0 MPa or less, and E1, E2, and a compression modulus (E3) of the compression layer satisfy formula (1) below.

$(E1/10) > E2 > E3$    Formula (1)

7 Claims, 1 Drawing Sheet

(51) Int. Cl.
*C08J 5/12* (2006.01)
*C08J 5/18* (2006.01)
*B32B 27/08* (2006.01)
*B41M 5/025* (2006.01)
*B41M 5/03* (2006.01)
*B41M 5/50* (2006.01)
*B41M 5/52* (2006.01)
*B41M 5/44* (2006.01)
*B41M 5/42* (2006.01)

(56) References Cited

U.S. PATENT DOCUMENTS

2006/0152566 A1* 7/2006 Taniuchi et al. .............. 347/103
2010/0060703 A1 3/2010 Ohara

FOREIGN PATENT DOCUMENTS

| | | | |
|---|---|---|---|
| JP | 9-101633 A | 4/1997 | |
| JP | 11-227177 A | 8/1999 | |
| JP | 2001-060044 A | 3/2001 | |
| JP | 2001060044 A * | 3/2001 | ............. G03G 15/16 |
| JP | 2001-228641 A | 8/2001 | |
| JP | 2003-005430 A | 1/2003 | |
| JP | 2003-182064 A | 7/2003 | |
| JP | 2003-202785 A | 7/2003 | |
| JP | 2004-174834 A | 6/2004 | |
| JP | 2004-279738 A | 10/2004 | |
| JP | 2008-018719 A | 1/2008 | |
| JP | 2010-002567 A | 1/2010 | |
| JP | 2010-113118 A | 5/2010 | |

* cited by examiner

INTERMEDIATE TRANSFER MEMBER FOR TRANSFER INK JET RECORDING

TECHNICAL FIELD

The present invention relates to an intermediate transfer member for transfer ink jet recording.

BACKGROUND ART

In a known transfer ink jet recording method, an ink is applied to an image-forming surface of an intermediate transfer member with an ink jet device to form an intermediate image, and then the intermediate image is transferred to a recording medium from the image-forming surface by pressing the intermediate image against the recording medium.

As an intermediate transfer member used in such a transfer ink jet recording method, PTL 1 discloses an intermediate transfer member including a rubber layer and a surface layer formed of sol-gel or the like. In PTL 1, it is described that the surface layer has an appropriate surface energy.

CITATION LIST

Patent Literature

PTL 1: Japanese Patent Laid-Open No. 2003-182064

SUMMARY OF INVENTION

Technical Problem

However, according to the investigation conducted by the inventors of the present invention, when recording is repeatedly performed using the intermediate transfer member disclosed in PTL 1, microcracks may be formed on the surface of the intermediate transfer member. It is believed that cracking is caused because, when pressure is applied to an intermediate transfer member due to the application of liquid such as ink or pressing of a recording medium, a surface layer cannot follow the deformation caused by the pressure.

A transfer ink jet recording method includes a step of forming an aggregate (intermediate image) on an intermediate transfer member. If there are cracks on the surface of the intermediate transfer member, the aggregate enters the cracks and thus is not transferred. As a result, a white patch may foe caused on a final image formed on the recording medium. Furthermore, if pressure is repeatedly applied while the aggregate is left in the cracks, formation of cracks is facilitated and the performance may be further degraded. Moreover, if a flocculating solution or a low-viscosity component contained in an ink is impregnated into the cracks, the surface layer of the intermediate transfer member may be delaminated. In the transfer ink jet recording method, the formation of cracks on an intermediate transfer member needs to be suppressed in terms of image quality and the life of the intermediate transfer member.

In the transfer ink jet recording method, a white patch of a final image may be caused due to uneven transfer pressure during the image transfer. This is probably because vibration of an apparatus in high-speed recording is transmitted to an intermediate transfer member or a recording medium and thus local pressure fluctuations are caused, which produces, in an intermediate image, a portion where sufficient pressure is not applied. In particular, a pressurization-depressurization cycle is quickly repeated in high-speed recording. Therefore, it is believed that such local pressure fluctuations are not easily reduced and a white patch of a final image is easily caused due to minor fluctuation factors.

Accordingly, the present, invention provides an intermediate transfer member for transfer ink jet recording in which formation of cracks on its surface is suppressed and that has good transferability.

Solution to Problem

An intermediate transfer member for transfer ink jet recording according to an aspect of the present invention includes a surface layer, a buffer layer, and a compression layer, wherein the intermediate transfer member is used in a transfer ink jet recording method that includes a step of forming an intermediate image by applying an ink on an image-forming surface of the intermediate transfer member with an ink jet device and a step of transferring the intermediate image to a recording medium from the image-forming surface by pressing the intermediate image against the recording medium; the surface layer, the buffer layer, and the compression layer are formed in that order from the image-forming surface side; a compression modulus ($E1$) of the surface layer is 300 MPa or more and 10000 MPa or less; a compression modulus ($E2$) of the buffer layer is 0.5 MPa or more and 30.0 MPa or less; and $E1$, $E2$, and a compression modulus ($E3$) of the compression layer satisfy formula (1) below.

$$(E1/10) > E2 > E3 \qquad \text{Formula (1)}$$

Advantageous Effects of Invention

According to the present invention, there can be provided an intermediate transfer member for transfer ink jet recording in which formation of cracks on its surface is suppressed and that has good transferability.

DESCRIPTION OF EMBODIMENT

Figure 1:
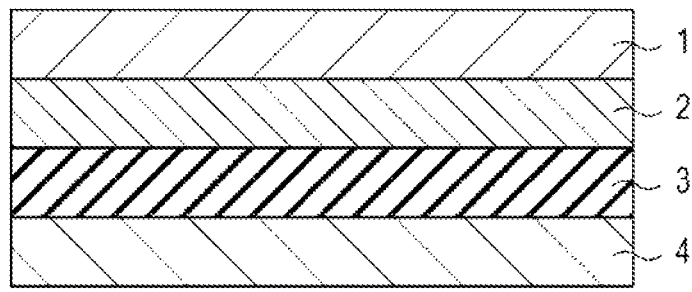
FIG. 1 shows an intermediate transfer member for transfer ink jet recording according to an aspect of the present invention.

The present invention will now be described in detail.
Intermediate Transfer Member FIG. 1 is a configuration diagram of an intermediate transfer member for transfer ink jet recording according to an aspect of the present, invention. The intermediate transfer member for transfer ink jet recording is disposed on a supporting member 4. The intermediate transfer member includes a surface layer 1, a buffer layer 2, and a compression layer 3 in that, order from the image-forming surface side (front side). Each of the layers will now be described in detail.

The surface layer according to an aspect of the present, invention is formed on the image-forming surface side and includes an image-forming surface. The surface layer can be composed of a material such as resin or ceramic and can be particularly composed of a material having a high compression modulus in terms of durability. Specific examples of the material include acrylic resin, acrylic-silicone resin, fluorine-containing resin, and condensates obtained by condensing a hydrolyzable organic silicon compound. Among them, condensates obtained by condensing an organic silicon compound can be used in terms of transferability, and polymers produced by cationic polymerization or radical polymerization can be used in terms of durability. When the surface layer contains a hydrolyzable organic silicon compound, it is supposed that components of an ink constituting an image diffuse into the surface layer and thus the transferability is improved. The surface layer preferably contains such resin and ceramic in an amount of 10% or more and 100% or less by mass, more preferably 30% or more by mass, and further preferably 50% or more by mass.

In the present invention, the compression modulus of the surface layer is given as E1. The compression modulus (E1) of the surface layer is set to be 300 MPa or more and 10000 MPa or less. A compression modulus of 300 MPa or more can improve the wear resistance of the intermediate transfer member. A compression modulus of 10000 MPa or less can suppress an excessive increase in the elasticity of the entire intermediate transfer member. The compression modulus (E1) of the surface layer is preferably 1000 MPa or more and 8000 MPa or less and more preferably 1000 MPa or more and 5500 MPa or less.

The thickness of the surface layer is preferably 0.01 micrometers or more and 10.0 micrometers or less and more preferably 2.0 micrometers or less, if the thickness is less than 0.01 micrometers, it tends to be difficult to uniformly cover the surface of the intermediate transfer member. If the thickness is more than 10.0 micrometers, the internal stress during deformation becomes excessively large and thus the advantages of the present invention, sometimes cannot be sufficiently produced.

The compression layer according to an aspect of the present invention has a function of absorbing pressure fluctuations. The compression layer absorbs deformation and suppresses local pressure fluctuations. Therefore, good transferability can be maintained even in high-speed printing. The compression layer is composed of acrylonitrile-butadiene rubber, acrylic rubber, chloroprene rubber, urethane rubber, silicone rubber, or the like. The compression layer preferably contains such rubber in an amount of 10% or more and 100% or less by mass, more preferably 30% or more by mass, and further preferably 50% or more by mass. In the molding of the above-described rubber material, a predetermined amount of vulcanizing agent and vulcanization accelerator may be added. Furthermore, an antifoaming agent and a filler such as hollow fine particles or common salt may be optionally added to form a porous product. The compression layer can be composed of a porous rubber material. When various pressure fluctuations occur, the air bubbles are compressed with their volume change. Therefore, the deformation in directions other than the compressed direction is small, which can provide more stable transferability and durability. A porous rubber material has a continuous porous structure in which pores communicate with each other and an independent porous structure in which pores are independently present. In the present invention, either of the structures may be employed and both the structures may be employed in combination.

The durometer type A (in conformity with JIS K 6253) hardness of the rubber used for the compression layer is preferably 20 degrees or more and 80 degrees or less and more preferably 60 degrees or less. If the hardness is less than 20 degrees, the recovery property of the intermediate transfer member tends to be degraded and the pressure required for transfer tends to be not easily achieved. If the hardness is more than 80 degrees, the intermediate transfer member may be scratched when foreign substances get caught or double feeding of recording media occur.

In the present invention, the compression modulus of the compression layer is given as E3. The compression modulus (E3) of the compression layer and a compression modulus (E2) of the buffer layer have a relationship of E2>E3. The compression modulus (E3) is preferably 0.05 MPa or more and 20.0 MPa or less, more preferably 0.1 MPa or more and 10.0 MPa or less, and particularly preferably 1.0 MPa or more and 7.0 MPa or less.

The thickness of the compression layer is preferably 0.1 mm or more and 1.0 mm or less and more preferably 0.2 mm or more and 0.5 mm or less, if the thickness is less than 0.1 mm, the compression layer sometimes does not sufficiently function at high transfer pressure. If the thickness is more than 1.0 mm, the compression layer is distorted in the shear direction daring the transfer, which tends to reduce the image quality.

The intermediate transfer member according to an aspect of the present invention includes a buffer layer between the surface layer and the compression layer. The buffer layer can be composed of a material such as resin or ceramic. In terms of workability, various elastomer materials and rubber materials can be used. Specific examples of the materials include fluoro silicone rubber, phenyl silicone rubber, fluororubber, chloroprene rubber, urethane rubber, nitrite rubber, ethylene propylene rubber, natural rubber, styrene rubber, isoprene rubber, butadiene rubber, ethylene/propylene/butadiene copolymers, and nitrile butadiene rubber. In particular, silicone rubber, fluoro silicone rubber, and phenyl silicone rubber can be used in terms of dimensional stability and durability because they have a low permanent compression set. They can also be used in terms of transferability because a change in elastic modulus with temperature is small. Furthermore, urethane rubber can be used in terms of suppression of cracking because it easily adheres to a material of the surface layer having high polarity. The buffer layer preferably contains such resin, ceramic, and rubber in an amount of 10% or more and 100% or less by mass in total, more preferably 30% or more by mass, and further preferably 50% or more by mass.

In the present invention, the compression modulus of the buffer layer is given as E2 [MPa]. The compression modulus (E2) of the buffer layer is set to be 0.5 MPa or more and 30.0 MPa or less. The compression modulus (E2) is preferably 1.0 MPa or more, more preferably 3.0 MPa or more and 25.0 MPa or less, and particularly preferably 5.0 MPa or more and 22.0 MPa or less. When the compression modulus (E2) is 0.5 MPa or more, the buffer layer is prevented from being significantly deformed and thus the surface layer can easily follow the deformation of the buffer layer. When the compression modulus (E2) is 30.0 MPa or less, the stress locally applied to the surface layer particularly during high-speed printing can be sufficiently reduced. As a result, the crack resistance and transferability can be improved.

The thickness of the buffer layer is preferably 0.1 mm or more and 5.0 mm or less and more preferably 0.2 mm or more and 2.0 mm or less.

In the present invention, the compression modulus (E1) of the surface layer, the compression modulus (E2) of the buffer layer, and the compression modulus (E3) of the compression layer satisfy the following formula (1).

$$(E1/10) > E2 > E3 \qquad \text{Formula (1)}$$

Such a configuration can make full use of the advantages of the compression layer and satisfactorily suppress the formation of microcracks on the surface layer. That is, the deformation of the compression layer is not directly transmitted to the surface layer due to the buffer layer. Therefore, the surface layer does not rapidly deform, which can suppress the formation of cracks. Furthermore, local pressure fluctuations during high-speed printing can be reduced in stages (surface layer to buffer layer and buffer layer to compression layer). Consequently, since the application of large stress to the surface layer can be suppressed, good transferability can be achieved.

In the present, invention, an adhesive or a double-sided tape having a thickness that does not affect the present invention may be used between the adjacent layers of the surface layer, buffer layer, and compression layer or between the compression layer and the supporting member in order to fix and hold such layers. A reinforcement layer composed of a film having a compression modulus of more than 30.0 MPa may be disposed to suppress the lateral extension caused when the installation in an apparatus and to retain the elasticity. A woven fabric may be used as the reinforcement layer.

The size of the intermediate transfer member can be freely selected in accordance with the size of intended print images. The intermediate transfer member may have a shape of a sheet, roller, drum, belt, or endless web.

In the present invention, the term "compression modulus" is a value measured in accordance with JIS K 7181 using a viscoelastic spectrometer. In the present invention, the thickness of each of the layers is determined by measuring the thicknesses at ten arbitrary points selected without causing a bias using an electron microscope and then averaging the thicknesses.

Transfer Ink Jet Recording Apparatus

Figure 2:
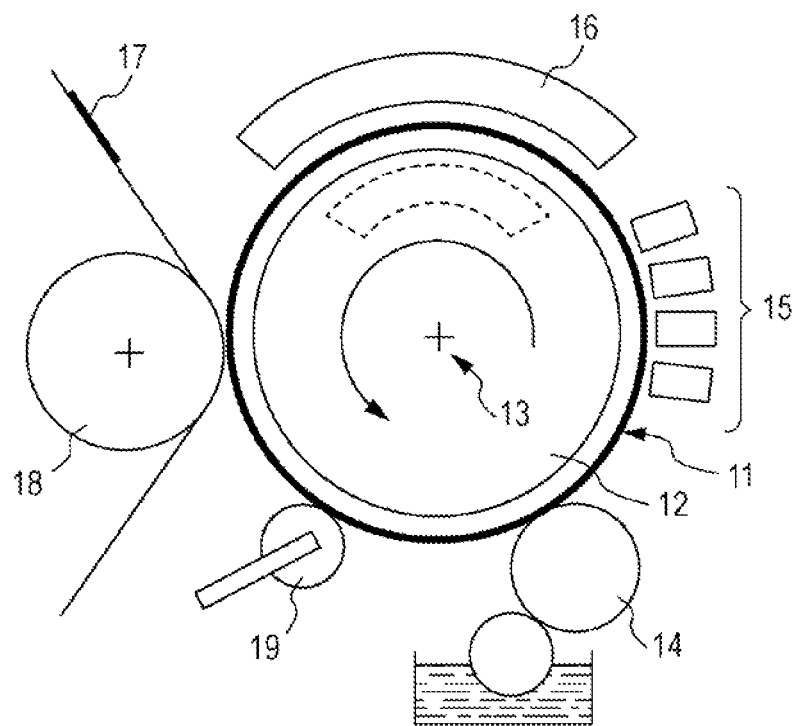
FIG. 2 shows an transfer ink jet recording apparatus according to an aspect of the present invention.

FIG. 2 shows an a transfer ink jet recording apparatus according to an aspect of the present invention. In FIG. 2, a flocculating solution is applied to an image-forming surface of an intermediate transfer member 11 with a coating roller 14. An ink is applied to the image-forming surface with an ink jet device 15 to form an intermediate image. The intermediate image formed on the intermediate transfer member is pressed against a recording medium 17 with a pressing roller 18 to transfer die intermediate image to the recording medium.

The intermediate transfer member can be disposed on a supporting member 12. The supporting member 12 rotates about a shaft 13 in the direction indicated by an arrow. The devices surrounding the intermediate transfer member operate in synchronism with the rotation. The supporting member needs to have a sufficient structural strength in terms of durability and the accuracy with which the recording medium is transported. The supporting member can be composed of a material such as a metal, ceramic, or resin. In particular, because of its high rigidity resistant to transfer pressure, dimensional accuracy, and reduced operational inertia to improve control responsivity, the supporting member can be composed of a material such as aluminum, iron, stainless steel, acetal resin, epoxy resin, polyimide, polyethylene, polyethylene terephthalate, nylon, polyurethane, silica ceramic, or alumina ceramic. These materials may be used in combination. The structure of the supporting member depends on the type of the recording apparatus or the process of transferring intermediate images to a recording medium. For example, the supporting member may be a roller or a belt. A drum-shaped supporting member or a belt-shaped supporting member in the form of an endless web can be repeatedly used in a continuous manner. Thus, productivity can be improved.

Flocculating Solution Applying Step

A flocculating solution may be applied to an intermediate transfer member before the application of an ink. The flocculating solution can be applied by any known method. Examples of the method include die coating, blade coating, and gravure rollers. These may be combined with offset rollers. An ink jet device can be used to apply the flocculating solution at high speed with high precision.

The flocculating solution contains a component for increasing the viscosity of ink. Such a component can partially reduce the flowability of an ink and/or an ink composition on an intermediate transfer member, thereby reducing bleeding or beading. For example, in the formation of images with an ink jet device, an amount of ink applied per unit area may become large. This tends to cause bleeding or beading. However, when a flocculating solution is applied on an intermediate transfer member, the flowability of an ink is decreased. This can reduce bleeding or beading and thus an image can be satisfactorily formed and retained.

The flocculating solution is appropriately selected in accordance with the type of ink used for the formation of images. For a dye ink, a flocculating solution containing a polymer flocculant as the component for increasing the viscosity of ink can be used. Examples of the polymer flocculant include cationic polymer flocculants, anionic polymer flocculants, nonionic polymer flocculants, and amphoteric polymer flocculants. For a pigment ink containing fine particles dispersed therein, a flocculating solution containing a polyvalent, metal ion as the component for increasing the viscosity of ink or a flocculating solution containing a pH-adjusting agent such as an acid buffer solution can be used. The flocculating solution may also be a compound having a plurality of ionic groups, such as a cationic polymer. These compounds may be used in combination.

Examples of the polyvalent, metal ion serving as the component for increasing the viscosity of ink include divalent metal ions such as $Ca^{2+}$, $Cu^{2+}$, $Ni^{2+}$, $Mg^{2+}$, $Sr^{2+}$, $Ba^{2+}$, and $Zn^{2+}$, and trivalent metal ions such as $Fe^{3+}$, $Cr^{3+}$, $Y^{3+}$, and $Al^{3+}$. A flocculating solution containing such a metal ion can be applied in the form of an aqueous solution of its metal salt. Examples of anions of the metal salt include, but are not limited to, $Cl^-$, $NO_3^-$, $CO_3^{2-}$, $SO_4^{2-}$, $I^-$, $Br^-$, $ClO_3^-$, $HCOO^-$, and $RCOO^-$ (where R is an alkyl group). The concentration of the metal salt in the aqueous solution is preferably 0.01% or more by mass, more preferably 0.1% or more by mass, and preferably 20% or less by mass.

An acid solution having a pH of less than 7.0 can be used as a pH-adjusting agent serving as the component for increasing the viscosity of ink. Examples of the acid include inorganic acids such as hydrochloric acid, phosphoric acid, sulfuric acid, nitric acid, and boric acid; and organic acids such as oxalic acid, polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumalic acid, thiophenecarboxylic acid, and nicotinic acid. The derivatives of these compounds or the solutions of these salts may be used.

An acid buffer solution (buffer) having pH-buffering capacity can reduce variations in the pH of the flocculating solution even when the flocculating solution is diluted with an ink, thereby preventing a reduction in the reactivity between the flocculating solution and the ink. The pH-buffering capacity can be achieved by adding a buffering agent to the flocculating solution. Examples of the buffering agent include acetates such as sodium acetate, potassium acetate, and lithium acetate; hydrogen phosphates; hydrogen carbonates; and hydrogen salts of polyvalent carboxylic acids, such as sodium hydrogen phthalate and potassium hydrogen phthalate. Examples of the polyvalent carboxylic acids include malonic acid, maleic acid, succinic acid, fumaric acid, itaconic acid, phthalic acid, isophthalic acid, terephthalic acid, adipic acid, sebacic acid, dimer acid, pyromellitic acid, and trimellitic acid. Other compounds having pH-buffering capacity may also be used.

The flocculating solution according to an aspect of the present invention can be prepared by dissolving the above-described component for increasing the viscosity of ink in an aqueous medium. Examples of the aqueous medium, include water and a mixed solvent of water and an aqueous organic solvent. Specific examples of the aqueous organic solvent include alkanediols such as 1,3-butanediol, 1,5-pentanediol, 1,2-hexanediol, and 1,6-hexanediol; glycol ethers such as diethylene glycol monomethyl (or ethyl)ether and methylene glycol monoethyl (or butyl)ether; alkyl alcohols having 1 to 4 carbon atoms, such as ethanol, isopropanol, n-butanol, isobutanol, secondary butanol, and tertiary butanol; carboxylic acid amides such as N,N-dimethylformamide and N,N-dimethylacetamide; ketones such as acetone, methyl ethyl ketone, 2-methyl-2-hydroxypentan-4-one; keto-alcohols; cyclic ethers such as tetrahydrofuran and dioxane; glycerin; alkylene glycols such as ethylene glycol, di-ethylene glycol, triethylene glycol, tetraethylene glycol, 1,2- or 1,3-propylene glycol, 1,2- or 1,4-butylene glycol, and polyethylene glycol; polyhydric alcohols such as thiodiglycol, 1,2,6-hexanetriol, and acetylene glycol derivatives; 2-pyrrolidone, N-methyl-2-pyrrolidone, and 1,3-dimethyl-2-imidazolidinone; and sulfur-containing compounds such as dimethyl sulfoxide. These aqueous organic solvents may be used in combination. To impart desired properties to the flocculating solution, an antifoaming agent, a preservative, and a fungicide can be optionally added to the flocculating solution, in addition to the above-described component.

To improve transferability or the fastness of final images, a certain resin can be added to the flocculating solution. Such a resin can increase the adhesion of intermediate images to a recording medium and the mechanical strength of the intermediate images. A certain type of resin may improve the water-fastness of final images on a recording medium. Any resin compatible with the component for increasing the viscosity of ink can be used for this purpose. Examples of such a resin include organic polymers such as polyvinyl alcohol and polyvinylpyrrolidone. The resin may react with an ink component to form a crosslinked structure. For example, oxazoline or carbodiimide can react with carboxylic acid, which is used to disperse a coloring material in an ink, to form a crosslinked structure. These resins may be dissolved in a solvent of the flocculating solution or may be added in the form of emulsion or suspension. A surfactant may be further added to the flocculating solution to control the surface tension.

Intermediate Image Forming Step

An ink is applied to the image-forming surface of the intermediate transfer member 11 with the ink jet device 15. In FIG. 2, an ink is applied to the image-forming surface to which a flocculating solution has been applied. Examples of the ink jet device include devices that discharge an ink by causing film boiling of the ink with an electrothermal transducer to form air bubbles, devices that discharge an ink with an electromechanical transducer, and devices that discharge an ink utilizing static electricity. The devices including an electrothermal transducer can be used to perform high-speed high-density printing.

The ink jet device may have any structure. The ink jet device may have a line head or a shuttle head.

In the present, invention, there can be utilized inks commonly used as ink jet inks, more specifically, various inks containing a coloring material, such as a dye, carbon black, or an organic pigment, dissolved and/or dispersed therein. In particular, inks containing carbon black or an organic pigment, can be used because images having excellent weather resistance and color developability are produced.

The ink may be an aqueous ink containing water. The aqueous ink may contain 45.0% or more by mass of water. The content of the coloring material of the ink is preferably 0.1% or more by mass and more preferably 0.2% or more by mass. The content is preferably 15.0% or less by mass and more preferably 10.0% or less by mass. The coloring material contains a dye, a pigment, and a resin associated therewith. The coloring material may be a publicly known coloring material described in Japanese Patent Laid-Open No. 2008-018719.

A water-soluble resin, or a water-soluble crosslinking agent may be added to the ink to improve the fastness of images finally formed on a recording medium. Any water-soluble resin or water-soluble crosslinking agent compatible with the ink components can be used.

In a transfer ink jet recording method according to an aspect of the present invention, an ink that is about to be transferred to a recording medium principally contains only a coloring material and an organic solvent having a high boiling point. To improve transferability, it is effective for the ink to contain an organic solvent. A water-soluble material having a high boiling point and a low vapor pressure can be used as the organic solvent. Examples of the organic solvent, include alkanediols such as 1,3-butanediol, 1,5-pentanediol, 1,2-hexanediol, and 1,6-hexanediol; glycol ethers such as diethylene glycol monomethyl (or ethyl)ether and triethylene glycol monoethyl (or butyl)ether; alkyl alcohols having 1 to 4 carbon atoms, such as ethanol, isopropanol, n-butanol, isobutanol, secondary butanol, and tertiary butanol; carboxylic acid amides such as N,N-dimethylformamide and N,N-dimethylacetamide; ketones such as acetone, methyl ethyl ketone, 2-methyl-2-hydroxypentan-4-one; keto-alcohols; cyclic ethers such as tetrahydrofuran and dioxane; glycerin; alkylene glycols such, as ethylene glycol, diethylene glycol, triethylene glycol, tetraethylene glycol, 1,2- or 1,3-propylene glycol 1,2- or 1,4-butylene glycol, and polyethylene glycol; polyhydric alcohols such as thiodiglycol and 1,2,6-hexanetriol; heterocyclic compounds such as 2-pyrrolidone, N-methyl-2-pyrrolidone, 1,3-dimethyl-2-imidazolidinone, and N-methylmorpholine; and sulfur-containing compounds such as dimethyl sulfoxide. These organic solvents may be used in combination.

The ink according to an aspect of the present invention may optionally contain various additives such as a pH-adjusting agent, an anticorrosive, a preservative, a fungicide, an antioxidant, a reduction inhibitor, a neutralizing agent for water-soluble resins, and a salt. Furthermore, a surfactant may be optionally added to control the surface tension of the ink. Any surfactant may be used as long as it does not significantly affect the storage stability of the ink. Examples of the surfactant include anionic surfactants such as fatty acid salts, higher alcohol sulfates, liquid fatty oil sulfates, and alkyl allyl sulfonates; and nonionic surfactants such as polyoxyethylene alkyl esters, polyoxyethylene sorbitan alkyl esters, acetylene alcohols, and acetylene glycols. These surfactants may be used in combination.

The composition of the ink is not particularly limited as long as the ink can be discharged in view of the discharging power of an ink jet head selected and its nozzle diameter.

Drying Step

In FIG. 2, the liquid content of an intermediate image is reduced with a heater 16. If the liquid content, of an intermediate image is excessively high, the excessive liquid may overflow in the subsequent transfer step. This sometimes disturbs the intermediate image or impairs the transferability. The liquid content may be reduced by any known method. Examples of the method include a heating method, a method using dry air, a pressure-reducing method, and a method using an absorbent. These methods may be combined with each other. Alternatively, natural drying may be performed.

Transfer Step

After the drying step, the intermediate image on the image-forming surface of the intermediate transfer member is transferred to a recording medium by pressing the intermediate image against the recording medium to produce a printed material on which a final image is recorded. Examples of the recording medium include plain paper and glossy paper for use in general printing, cloths, plastics, films, and other media to be printed. A recording medium may be pressed against the intermediate transfer member with a pressing roller 18 to efficiently transfer an intermediate image. Multistep pressurization can also improve the transferability.

Cleaning Step

An intermediate transfer member may be repeatedly used in a continuous manner in terms of productivity. In such continuous operation, the surface of the intermediate transfer member can be cleaned with a cleaning roller 19 before the subsequent formation of images. The cleaning may be performed by any known method. Examples of the cleaning method include a method in which a cleaning shower is applied to the surface, a method in which a dampening roller is brought into contact, with the surface to perform wiping, a method in which the surface is brought into contact with a cleaning liquid surface, a method in which scraping is performed with a wiper blade, and methods utilizing various energies. These methods may be combined with, each other.

EXAMPLES

Examples and Comparative Examples of the present invention will now be described.

Intermediate transfer members of Examples and Comparative Examples were produced by stacking a reinforcement layer composed of three laminated sheets of woven fabric, a compression layer, a reinforcement layer composed of a single woven fabric, a buffer layer, and a surface layer on a supporting member in that order. The compression layer; the buffer layer, and the surface layer of each of the intermediate transfer members were produced as follows.

Compression Layer A

An adhesive was applied on a surface of a reinforcement layer, and then Hyper-gel sheet (manufactured by Exseal Corporation, Ltd.) was pasted on the reinforcement layer to obtain a compression layer A. The compression layer A had a thickness of 0.4 mm.

Compression Layers B and C

A material prepared by adding known additives to acrylonitrile butadiene rubber was stacked on a surface of a reinforcement layer. Subsequently, vulcanization was performed to obtain porous compression layers B and C. The elastic moduli of the compression layers B and C were adjusted by changing the types and amounts of additives. The compression layers B and C each had a thickness of 0.4 mm.

Buffer Layers A, B, and C

Silicone rubber was formed on the compression layer with a reinforcement, layer therebetween, and then vulcanization was performed to obtain a buffer layer A. Similarly, urethane rubber was formed on the compression layer with a reinforcement layer therebetween, and then vulcanization was performed to obtain a buffer layer B. Acrylonitrile butadiene rubber was formed on the compression layer with a reinforcement layer therebetween, and then, vulcanization was performed to obtain a buffer layer C. The buffer layers A, B, and C each had a thickness of 0.8 mm.

Surface Layer A

Seventy-two parts by mass of VISCOAT 8F (manufactured by OSAKA ORGANIC CHEMICAL INDUSTRY LTD.), 3 parts by mass of dimethylaminomethyl methacrylate, 5 parts by mass of ARONIX M-305 (manufactured by TOAGOSEI CO., LTD.), 20 parts by mass of urethane oligomer (manufactured by TOAGOSEI CO., LTD., number-average molecular weight: 10000), and 2 parts by mass of DAROCUR 1173 (manufactured by Ciba Specialty Chemicals) serving as a photoinitiator were mixed with each other. The mixture was diluted to 12% by mass with methyl isobutyl ketone to obtain a coating solution. The coating solution was applied on the buffer layer by spin coating to form, a layer. After the layer was exposed through irradiation with ultraviolet rays using a UV lamp, the layer was cured by application of heat at 120 degrees centigrade for 2 hours to obtain a surface layer A. The surface layer A had a thickness of 0.8 micrometers.

Surface Layer B

Glycidoxypropyltriethoxysilane and methyltriethoxysilane were mixed with each other at a molar ratio of 1:1. The mixture was heat-refluxed in water for more than 24 hours using hydrochloric acid as a catalyst to obtain a solution containing a condensate that was obtained by condensing an organic silicon compound. This solution was diluted to 12% by mass with methyl isobutyl ketone, and 5% by mass of photocationic initiator SP150 (manufactured by ADEKA Corporation) was added thereto on a solid content basis to obtain a coating solution. The coating solution was applied on the buffer layer subjected to plasma treatment by spin coating to form a layer. After the layer was exposed through irradiation with ultraviolet rays using a UV lamp, the layer was cured by application of heat at 120 degrees centigrade for 2 hours to obtain a surface layer B. The surface layer B had a thickness of 1.0 micrometers.

Surface Layer C

A one-component urethane-modified acrylic resin (manufactured by TOAGOSEI CO., LTD.) was diluted to 10% by mass with methyl ethyl ketone to obtain a coating solution. The coating solution was applied on the buffer layer by spin coating to form a layer. The layer was cured by application of heat at 120 degrees centigrade for 2 hours to obtain a surface layer C. The surface layer C had a thickness of 1.0 micrometers.

Table 1 shows the configuration of the intermediate transfer members of Examples 1 to 6 and Comparative Examples 1 to 5. Note that the intermediate transfer member of Comparative Example 1 did not have a buffer layer and a compression layer and a coating solution for forming a surface layer was applied on a reinforcement layer. A compression modulus was measured in accordance with JIS K 7181 using a viscoelastic spectrometer (product name: EXSTAR DMS 6100 manufactured by SII NanoTechnology Inc.).

TABLE 1

| | Surface layer | E1 [MPa] | Buffer layer | E2 [MPa] | Compression layer | E3 [MPa] |
|---|---|---|---|---|---|---|
| Example 1 | A | 2900 | C | 21.0 | A | 3.3 |
| Example 2 | A | 2900 | C | 10.4 | A | 3.3 |
| Example 3 | B | 3200 | C | 10.4 | A | 3.3 |
| Example 4 | B | 3200 | C | 10.4 | C | 5.3 |
| Example 5 | B | 3200 | A | 5.5 | C | 5.3 |
| Example 6 | B | 3200 | B | 6.8 | C | 5.3 |

TABLE 1-continued

| | Surface layer | E1 [MPa] | Buffer layer | E2 [MPa] | Compression layer | E3 [MPa] |
|---|---|---|---|---|---|---|
| Comparative Example 1 | A | 2900 | — | — | — | — |
| Comparative Example 2 | A | 2900 | B | 4.6 | B | 7.2 |
| Comparative Example 3 | C | 270 | C | 10.4 | C | 5.3 |
| Comparative Example 4 | A | 2900 | B | 0.4 | C | 5.3 |
| Comparative Example 5 | A | 2900 | C | 37.0 | C | 5.3 |

Evaluation

The intermediate transfer members produced above were evaluated with the intermediate transfer ink jet recording apparatus shown in FIG. 2. The supporting member of each of the intermediate transfer members was a cylindrical drum made of an aluminum alloy.

A flocculating solution was continuously applied on the surface of the intermediate transfer member with a roller coater. The flocculating solution was prepared by adding a surfactant and additives to a 13.0% by mass aqueous solution of calcium chloride (calcium chloride dihydrate) so as to have desired surface tension and viscosity. Subsequently, an ink for forming images was discharged from an ink jet device onto an image-forming surface of the intermediate transfer member to form an intermediate image (mirror image) on the intermediate transfer member. The ink jet device was a device that includes an electrothermal transducer and discharges an ink in an on-demand manner. The ink was a pigment ink containing a resin dispersant and had the following composition.

C.I. Pigment Blue 15 3.0 parts by mass

Styrene-acrylic acid-ethyl acrylate copolymer (acid value 240, weight-average molecular weight 5000) 1.0 part by mass Glycerin 10.0 parts by mass Ethylene glycol 5.0 parts by mass Acetylenol E100 (product name) 0.5 parts by mass Ion-exchange water 80.5 parts by mass A coated paper (product name: AURORA COAT manufactured by Nippon Paper Industries Co., Ltd., basis weight: 73.5 g/m$^2$) was used as a recording medium, and an intermediate image was transferred to the recording medium by pressing to form a final image. This transfer was performed 10000 times at 1.5 m/sec. By observing the intermediate transfer member and the final image after recording was performed 10000 times, the crack resistance and the transferability were evaluated in accordance with the criteria below.

Crack Resistance

The intermediate transfer member and final image were observed with an optical microscope and evaluated in accordance with the criteria below.

A: No scratches were observed on both the intermediate transfer member and final image.

B: Cracks were observed on the intermediate transfer member, but no scratches were observed on the final image.

C: Cracks were observed on the intermediate transfer member, and scratches were slightly observed on the final image.

D: Cracks were observed on the intermediate transfer member, and scratches were clearly observed on the final image.

Transferability

The intermediate transfer member and the image quality of the final image were observed with an optical microscope and evaluated in accordance with the criteria below.

A: No untransferred images were observed on the intermediate transfer member, and the final image was satisfactorily formed.

B: Untransferred images were slightly observed on the intermediate transfer member, but the final image was satisfactorily formed.

C: Untransferred images were slightly observed on the intermediate transfer member, and part of the final image was not sufficiently transferred.

D: Untransferred images were observed on the intermediate transfer member, and thermal image was not sufficiently transferred on the whole.

Table 2 shows the evaluation results.

TABLE 2

| | Crack resistance | Transferability |
|---|---|---|
| Example 1 | B | B |
| Example 2 | A | B |
| Example 3 | B | A |
| Example 4 | B | A |
| Example 5 | B | A |
| Example 6 | B | A |
| Comparative Example 1 | D | D |
| Comparative Example 2 | C | B |
| Comparative Example 3 | B | D |
| Comparative Example 4 | D | B |
| Comparative Example 5 | D | C |

As shown in Table 2, the intermediate transfer members of Examples 1 to 6 had good crack resistance and transferability.

On the other hand, the intermediate transfer member of Comparative Example 1 that did not include a buffer layer and a compression layer had poor crack resistance and transferability. The intermediate transfer members of Comparative Examples 2 and 4 in which E2>E3 was satisfied had poor crack resistance. The intermediate transfer member of Comparative Example 3 in which E1 was 270 MPa had poor transferability because the surface layer was degraded due to abrasion. The intermediate transfer member of Comparative Example 5 in which E2 was 37.0 MPa had poor crack resistance and transferability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-172932, filed Jul. 30, 2010, which is hereby incorporated by reference herein in its entirety.

The invention claimed is:

1. An intermediate transfer member for transfer ink jet recording comprising:
    a surface layer;
    a buffer layer; and
    a compression layer,
    wherein the intermediate transfer member is used in a transfer ink jet recording method that includes a step of forming an intermediate image by applying an ink on an image-forming surface of an intermediate transfer member with an ink jet device and a step of transferring the intermediate image to a recording medium from the image-forming surface by pressing the intermediate image against the recording medium, wherein the surface layer, the buffer layer, and the compression layer are formed in that order from the image-forming surface side, wherein the thickness of the surface layer is 0.01 μm or more and 2.0 μm or less, wherein a compression modulus (E1) of the surface layer is 300 MPa or more and 10000 MPa or less, wherein a compression modulus (E2) of the buffer layer is 0.5 MPa or more and 30.0 MPa or less, and wherein E1, E2, and a compression modulus (E3) of the compression layer satisfy formula (I) below $$(E1/10) > E2 > E3 \quad \text{Formula (I).}$$

2. The intermediate transfer member for transfer ink jet recording according to claim 1, wherein the surface layer contains a condensate obtains by condensing an organic silicon compound.

3. The intermediate transfer member for transfer ink jet recording according to claim 1, wherein the compression modulus (E3) is 1.0 MPa or more and 7.0 MPa or less.

4. The intermediate transfer member for transfer ink jet recording according to claim 1, wherein the thickness of the compression layer is 0.1 mm or more and 1.0 mm or less.

5. The intermediate transfer member for transfer ink jet recording according to claim 1, wherein the thickness of the buffer layer is 0.1 mm or more and 5.0 mm or less.

6. The intermediate transfer member for transfer ink jet recording according to claim 1, wherein the compression layer contains a rubber having the durometer type A hardness of 20 degrees or more and 80 degrees or less.

7. The intermediate transfer member for transfer ink jet recording according to claim 1, wherein the thickness of the compression layer is 0.1 mm or more and 1.0 mm or less, and
wherein the thickness of the buffer layer is 0.1 mm or more and 5.0 mm or less.

* * * * *